W. H. MINER.
FRICTION DRAFT GEAR FOR RAILWAY CARS.
APPLICATION FILED APR. 13, 1916.
1,251,083.
Patented Dec. 25, 1917.
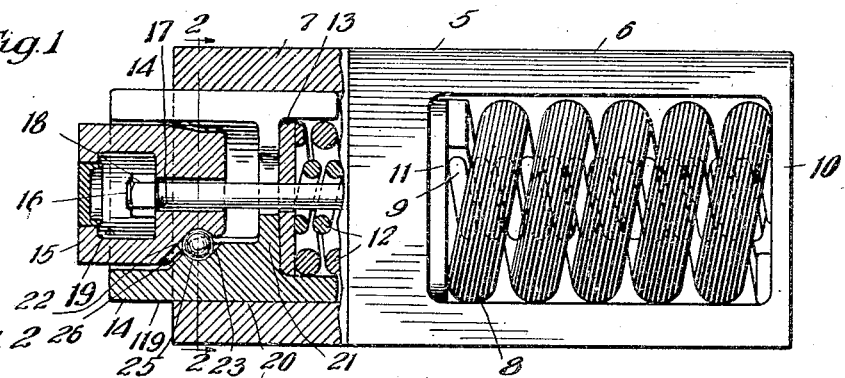
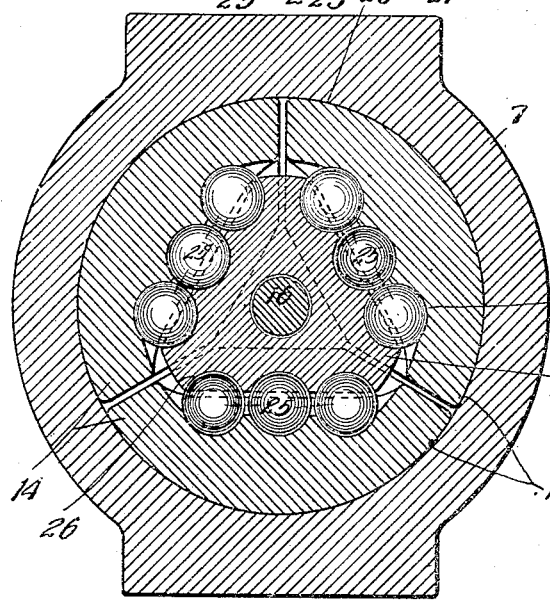
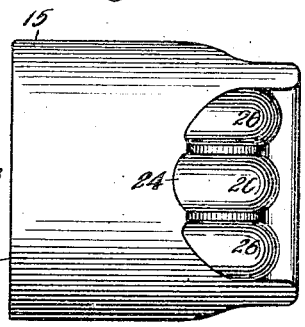
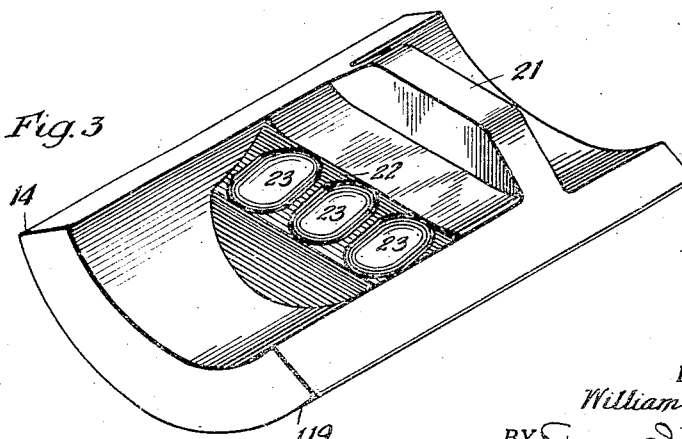
WITNESS
Wm. Geiger
INVENTOR.
William H. Miner
BY
ATTORNEY

UNITED STATES PATENT OFFICE.

WILLIAM H. MINER, OF CHAZY, NEW YORK.

FRICTION DRAFT-GEAR FOR RAILWAY-CARS.

1,251,083.  Specification of Letters Patent.  Patented Dec. 25, 1917.

Application filed April 13, 1916. Serial No. 90,844.

*To all whom it may concern:*

Be it known that I, WILLIAM H. MINER, a citizen of the United States, residing at Chazy, in the county of Clinton and State of New York, have invented a certain new and useful Improvement in Friction Draft-Gears for Railway-Cars, of which the following is a full, clear, concise, and exact description, reference being had to the accompanying drawings, forming a part of this specification.

My invention relates to improvements upon friction draft gear for railway cars.

The object of my invention is to provide a friction draft gear of efficient action both in compression and release.

In the drawings forming a part of this specification, Figure 1 is a side elevation partly in central longitudinal section of a draft gear embodying my invention. Fig. 2 is an enlarged cross sectional view on line 2—2 of Fig. 1. Fig. 3 is a perspective view of one of the friction shoes. Fig. 4 is a side elevation of the wedge.

It will be understood that the draft gear is adapted to be employed with other parts of a draft rigging for a railway car, but that only the draft gear proper is shown in the drawings.

Referring to the drawings, the numeral 5 indicates a shell of that type comprising a spring cage indicated at 6 and a friction casing 7. The spring parts comprising the springs 8 and 9 are mounted within the spring cage, being seated at their rear end against the inner rear face of the spring cage 10 and at their forward ends against the internal movable spring seat 11. The spring seat 11 has seated against its forward face the preliminary springs 12, which, in turn, at their forward ends are seated against the plate or washer 13. The friction parts contained within the friction casing 7 comprise a plurality, preferably three annularly arranged friction shoes 14 and the wedge 15. A connecting bolt 16 passes from the inner movable follower at its rear end through the plate or washer 13 and the perforation 17 in the wedge and is provided at its forward end with a nut 18 which is received in a recess 19 provided in the wedge. On inward travel of the friction parts, the preliminary spring is first compressed until the friction shoes engage the member 11, whereupon the springs within the spring cage are brought into full compression resisting action. The friction shoes 14 are each provided with an outer friction face 19 adapted to frictionally engage the inner friction face 20 of the friction shell. Each shoe is provided on its inner face with a shoulder 21 against which the washer or plate 13 engages and with the inclined wedging face 22, which is provided with at least one, but preferably a plurality as, for instance, three ball receiving grooves 23—23. The wedge is provided with a number of wedging faces 24 corresponding in number with the number of friction shoes. Mounted between each wedging face of the wedge and the adjacent wedging face of a shoe are anti-friction balls 25—25 that operate between the grooves 26—26 provided upon the wedging face of the wedge and the grooves 23 of the adjacent shoe hereinbefore described. The mounting of the anti-friction balls within the pockets formed by the grooves 23 upon the shoe on one side and the groove 26 upon the other side insures the anti-friction balls against any lateral displacement and consequent inequalities of pressure between the wedging faces and the wedging faces of the friction shoes. This, together with the quick adjustability of a plurality of balls to any change in the angle of thrust of the wedge in reference to the friction shoes insures a quick and certain release of the parts and a return to the normal position of the friction parts under spring pressure following compression of the gear.

I claim:

In a friction draft gear, in combination, a friction shell, a plurality of friction shoes, a wedge therefor, and anti-friction balls, the wedge being provided with a plurality of wedging faces, each of said faces being provided with a plurality of grooves, one of said friction shoes being mounted opposite each of the wedging faces of the wedge and having therein a plurality of grooves opposed to the grooves upon the wedging face, one of said anti-friction balls being mounted in each of the pockets formed by the said opposed grooves.

In witness that I claim the foregoing I have hereunto subscribed my name this 10th day of April, 1916.

WILLIAM H. MINER.

Copies of this patent may be obtained for five cents each, by addressing the "Commissioner of Patents, Washington, D. C."